US007820283B2

(12) United States Patent
Mittal et al.

(10) Patent No.: US 7,820,283 B2
(45) Date of Patent: Oct. 26, 2010

(54) METALLIZED SKIN PANELS AND METHODS OF MAKING

(75) Inventors: Amitabh Mittal, Kent, WA (US); Charles W. Newquist, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 549 days.

(21) Appl. No.: 11/763,994

(22) Filed: Jun. 15, 2007

(65) Prior Publication Data

US 2008/0311374 A1 Dec. 18, 2008

(51) Int. Cl.
*B32B 7/12* (2006.01)
*B32B 3/26* (2006.01)

(52) U.S. Cl. .............. 428/317.5; 428/317.7; 428/319.1; 428/319.3; 428/319.9

(58) Field of Classification Search .............. 428/317.5, 428/317.7, 319.1, 319.3, 319.7, 319.9
See application file for complete search history.

(56) References Cited

U.S. PATENT DOCUMENTS

| | | | | | |
|---|---|---|---|---|---|
| 3,352,742 | A | * | 11/1967 | Mulec et al. | 428/174 |
| 4,521,475 | A | * | 6/1985 | Riccio et al. | 428/142 |
| 5,036,789 | A | * | 8/1991 | Kelly et al. | 114/357 |

* cited by examiner

*Primary Examiner*—Hai Vo

(57) ABSTRACT

A metallized product includes a composite substrate or other substrate wherein at least a portion of the surface of the substrate is coated with an adhesion-promoting layer comprising resin and microballoons. A metallic coating is adhered to the adhesion promoting layer to produce the metallized surface. Methods for producing metallized products are also provided.

6 Claims, 3 Drawing Sheets

METALLIZED SKIN PANELS AND METHODS OF MAKING

TECHNICAL FIELD

The embodiments described herein generally relate to aircraft skin panels, and more particularly relate to metal-coated aircraft skin panels that have an intermediate adhesion-promoting layer between the metal coating and the underlying skin panel material, which may be a composite material.

BACKGROUND

In recent years, there has been increasing use of composite materials in aircraft structures, including the air frame structure, wings, rudder assemblies and skin panels. These composites are generally lightweight and therefore provide an opportunity to design lighter aircraft that have may have either a longer range or a greater payload, depending upon design criteria.

Composites generally include reinforcing filler encapsulated in a resin. The filler material may be fibers, particulates woven fabrics, or may be present in any other appropriate shape and form. The filler material may vary, and may include for example carbon fiber, graphite, fiber glass, and other appropriate materials. The resins may include for example the family of thermoplastic or thermosetting resins such as epoxy, phenolic, polyester, polyimide and other suitable engineering resins.

Composites generally are not electrically conductive. Accordingly, when composites are used as external skin panels on aircraft, the composites are sometimes metallized by the addition of a thin layer or coating of metal to the skin panel exterior surface. Typically, in aerospace the metal coating is aluminum because of its lightweight and electrical conductivity, although other metals may also be used. This metallization of the exterior composite skin panel surface shields a composite aircraft's internal electronic components from electromagnetic interference, and protects the aircraft during lightning storms.

Accordingly, it is desirable to develop processes for coating composite and other aircraft skin panels with a substantially uniform, metallic coating and for repairing metallic coatings of previously metallized aircraft skin panels. In addition, it is desirable that the coating is tightly-adhered to the aircraft skin panels. Other desirable features and characteristics of a process for making metallized skin panels include a capability to utilize existing coating equipment, and adaptability to coating a variety of shapes and sizes of composite and other substrates. Other features of the metallized composite, or other, skin panels and methods will become apparent from the subsequent detailed description and the appended claims, taken in conjunction with the accompanying drawings and the foregoing technical field and background.

BRIEF SUMMARY

An exemplary embodiment provides a composite product having a metallized surface. The composite product includes a composite substrate of a filler material encapsulated in a resin matrix. At least a portion of a surface of the composite substrate is coated with an adhesion-promoting layer comprising resin and glass or ceramic microballoons. A metallic coating is adhered to the adhesion-promoting layer to produce the metallized surface.

Another example provides a metallized composite aircraft exterior skin panel. The composite panel substrate includes a filler material encapsulated in a resin matrix. An adhesion-promoting layer, including resin and glass or ceramic microballoons, is adhered to at least a portion of the skin panel surface. A metallic coating is adhered to the adhesion-promoting layer to produce a metallized surface.

Another example of an embodiment includes a method of making a metallized composite product. The method includes the steps of preparing a surface of a composite substrate to be coated with a metallic coating, coating the prepared surface with a resin composition that includes micro balloons, and applying a coating of a metal over the resin composition-coated surface.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

An exemplary embodiment provides a metallized composite substrate that includes, but is not limited to, aircraft skin panels, fuselages, rudder assemblies, wings and other exterior and interior composite substrates. The metallic coating may be characterized as tightly-adhered. Adhesion strength may be tested in accordance with ASTM D 3359 Method A. A tape with minimum peel strength 60 oz per inch (as tested per ASTM D 3330 Method A), is placed over the a X-scored marking per D 3359 Method A, pressed down and then pulled away abruptly. The amount of material pulled off with the tape is compared with a standard to rate the adhesion. In these tests, the metallic coatings tested showed very little if any removal and qualify as Class 5 of ASTM d 3359 Method A; i.e., less than 5% of metal on the pulled-away tape. Accordingly, the term "tightly adherent" is an apt description of at least the tested metallic coatings. In addition, it is "substantially uniform" which means that it is continuous over the portion of the composite substrate surface that it covers, and it is of substantially uniform thickness. The metallic coatings are also "substantially free" of porosity at a levels that might interfere with coating performance with respect to intended function, such as conducting and dissipating lightning energy from an underlying substrate or shielding from electromagnetic interference or protecting an-underlying substrate from environmental conditions and typically encountered chemicals such as de-icing chemicals, cleaning chemicals and chemicals it might be expected to be exposed to in ordinary service.

Figure 1:
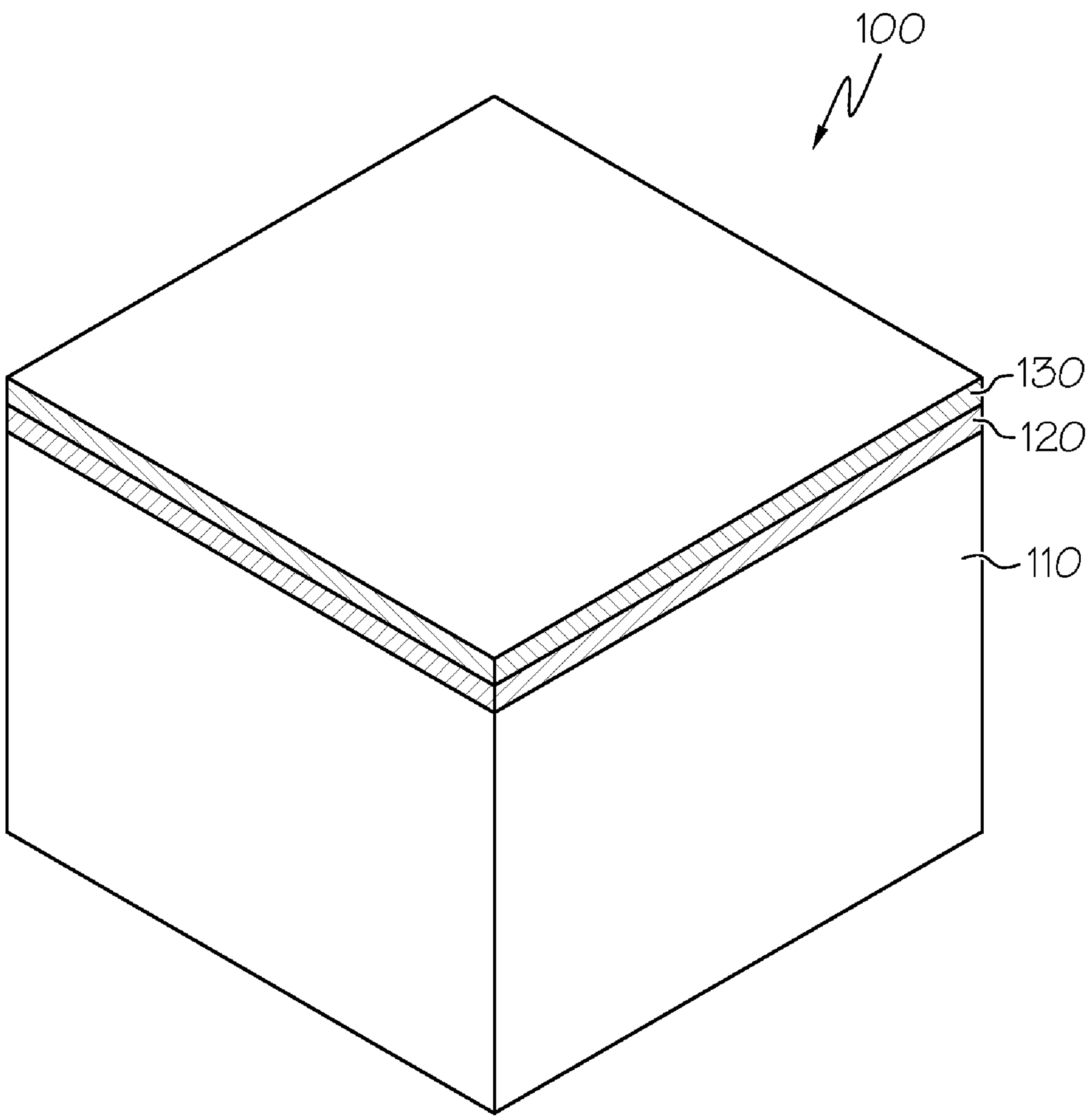
FIG. 1 is a perspective view illustrating an example of a metallized composite panel.

FIG. 1 illustrates a metallized composite 100 that includes a composite substrate 110 coated with a metallic coating 130. The composite substrate may include for example an aircraft skin panel, automobile part, or any other composite material that is desirably coated with metal for any purpose, whether for utility or for decorative reasons. An adhesion-promoting layer 120 that includes a resin containing glass or ceramic microballoons is coated on the surface of the composite substrate 110, and is in turn coated with the metallic coating 130. Accordingly, the adhesion-promoting layer 120 adheres well to composite material 110 and to the metallic coating 130 and is compatible with both.

Figure 2:
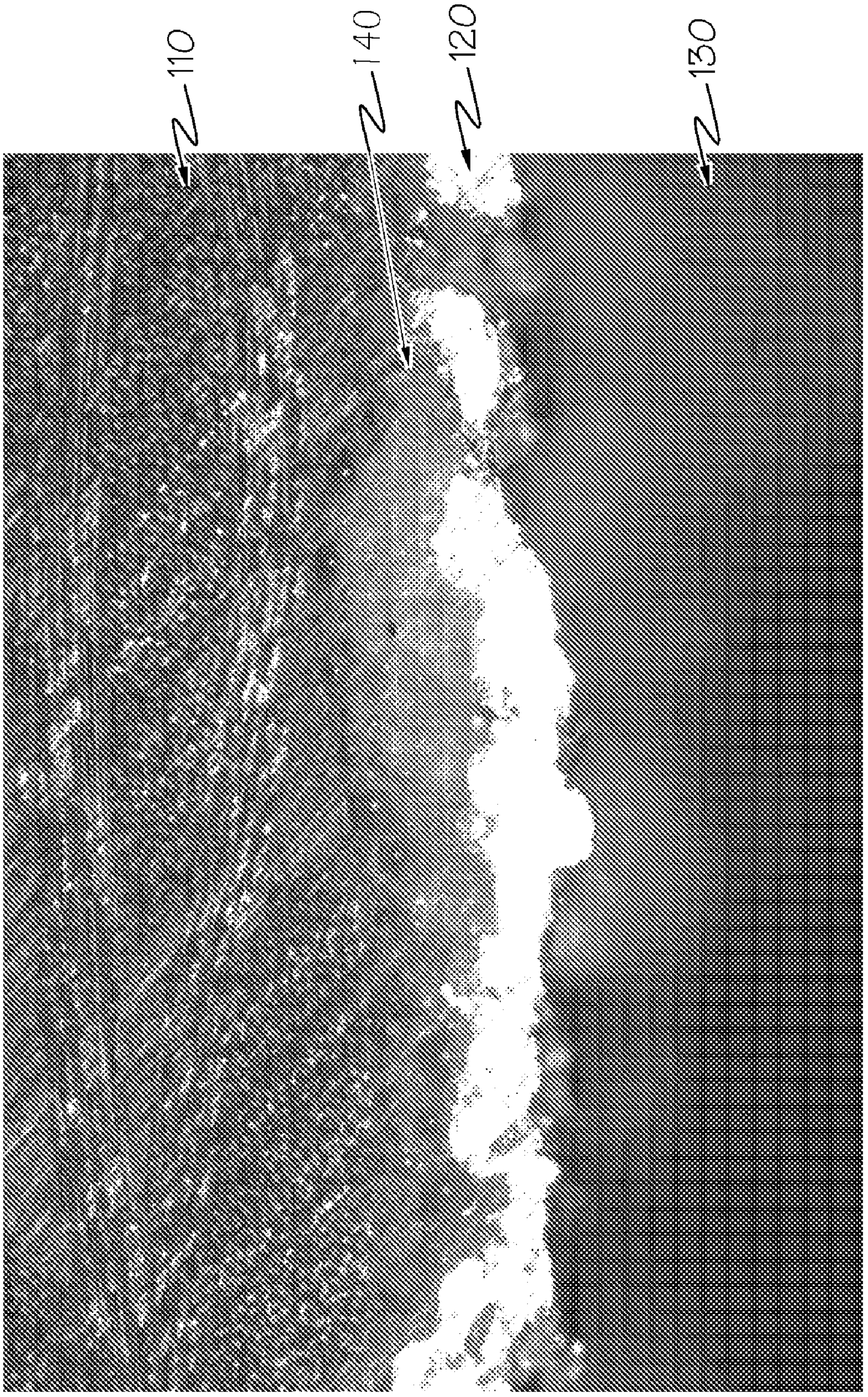
FIG. 2 is an optical micrograph of an example of an embodiment of a metallized composite at 50 times magnification.

FIG. 2 depicts a cross section at 50 times magnification of an exemplary embodiment of a composite substrate 110 that has a metallic coating 120, aluminum in this case, that appears as white in the photomicrograph. A layer of adhesion-promoting resinous material 140 that includes a dispersion of glass or ceramic microballoons (which are small hollow glass or ceramic spheres) is interposed between the composite 110 and the tightly-adhered, substantially uniform metallic coating 120. (The smooth area 130 is potting compound used to mount the sample for imaging purposes.)

It is believed, without being bound, that coating the composite substrate with a microballoon-containing resin provides an adhesion-promoting layer onto which a tightly-adhered, uniform metallic coating may be formed by a variety of processes, including for example, plasma flame spraying. The resin of the adhesion-promoting layer should adhere to the resin of the composite to be coated and should also be compatible with the metal to be subsequently coated thereon. It is believed, without being bound, that some of the micro balloons of the adhesion-promoting layer break and that the fragments of glass or ceramic facilitate adhesion of the metallic coating to the composite substrate underlying the microballoon-containing resin layer. It is also possible that heated metal particles adhere by fusing with glass or ceramic beads.

A variety of suitable resin compositions may be used, and glass (or ceramic) microballoons can be added in varying proportions to provide maximum adhesion. A suitable example of a microballoon-containing resin composition is BMS 5-28 Type 7 epoxy resin which is manufactured by Huntsman Chemicals of Salt Lake City Utah. These are available in Class I (CG-1305) and Class II (Epocast 89537). Of course, other resin compositions that contain suitable resins that adhere to the composite substrate and that are compatible with a selected metal coating may also be used. These resins need not contain microballoons as supplied by the vendor; the glass or ceramic microballoons may be added prior to use in the coating process. In general, the glass or ceramic microballoons should be in the average size range from about 1.0 to about 300 microns, may have a distribution of sizes with an average of about 75 microns. In general the thickness of the resin layer may vary widely from less than about 1 or 2 mils up to hundreds of mils depending upon the surface. Desirably the surface should be uniformly skim coated to a thickness in the range from about 5 to about 15 mils. If the surface to which resin is applied is not smooth, it may be skim coated with the resin to fill in any low spots and generally smooth the surface. As a result, some areas may have a thicker resin coating than others. After resin cure, the resin-coated surface may be sanded or grit blasted. A visual inspection may reveal whether there are bare spots after the sanding or grit blasting of the cured-resin coated surface. These may be skim coated with resin and the resin cured.

The metallic coating over the cured resin may have a thickness appropriate for its intended function. Generally, the metallic coating thickness is limited by the desired thickness for the particular application and the process limitations.

An example of a process that may be used to apply a metallic coating is flame spraying. Other useful processes include, without limitation, any thermal-spray processes that use a device (the gun) to melt and propel a coating material at low or high velocities onto a substrate where solidification occurs rapidly to form either a protective coating or a bulk shape. There are essentially three types of thermal spray guns: plasma, combustion-flame, and two-wire electric arc. The consumable coating material (known as "feedstock") is in the form of powder, wire, or rod. Combustion or electrical power provides the energy to achieve melting and acceleration of the powder feedstock. Coating thicknesses generally range between approximately 20 micrometers and several millimeters, depending on the process and feedstock and desired coating thickness. Coating quality may be measured in several parameters depending upon intended function of the coated substrate and includes without limitation, porosity, ductility, impact resistance, wear resistance, corrosion resistance, machinability, macro and micro hardness, bond strength to the substrate, surface roughness, conductivity, uniformity in thickness and texture. Other processes may also be used as appropriate for spraying the material.

Figure 3:
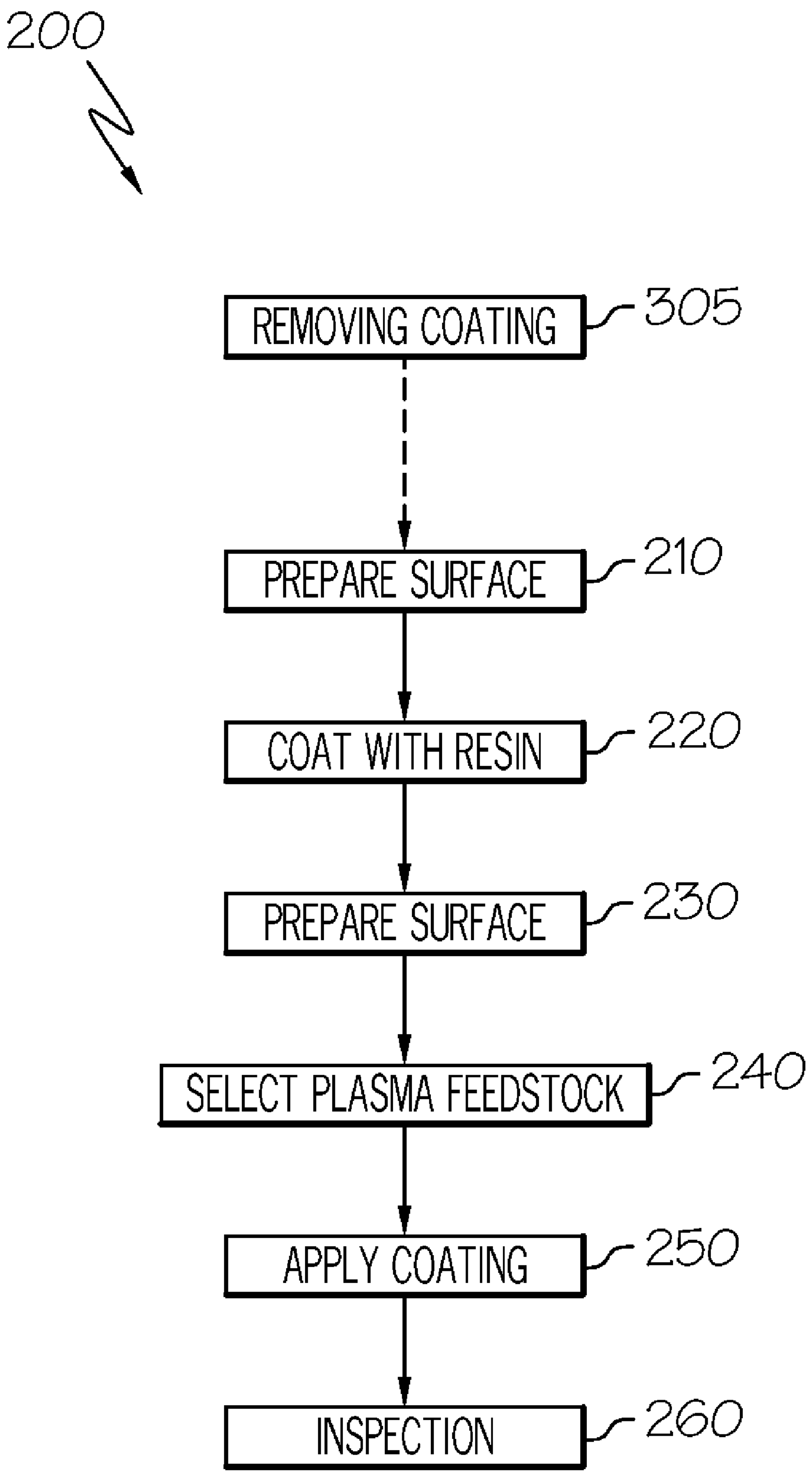
FIG. 3 is a block diagram illustrating steps in an exemplary embodiment of a method of metallizing a composite substrate.

FIG. 3 illustrates an example of an embodiment of a process 200 for applying a metallic coating using a flame spray process. As indicated before, other suitable coating processes may also be used. In process 210, the surface of the composite substrate is prepped to receive the balloon containing-resin coating. This may involve removal of loose dirt, washing with a mild detergent to degrease, or other cleaning processes. After surface preparation, the surface is coated with the preselected microballoon containing-resin to a desired thickness, in process 220. The resin coating is cured, in process 220. If necessary, the resin-coated surface may be prepared for receiving a metal coating in process 230. This preparation may include removal of any loose dirt, washing to remove grease, or other appropriate surface treatments. A suitable feedstock metal for the metal coating is selected in the desired form: powder, wire, or other, in process 240. The uniform, tightly-adhered, metallic coating is applied in a flame spray coating process for a time sufficient to form a coating of a desired thickness, in process 250. For example, and without limitation, the flame spraying process may be carried out using Metco™ flame spray guns (10E, 11E, 12E, 14E etc.) (supplied by Sulzer Metco of Winterthur, Switzerland) or equivalent guns; and oxy-acetylene, oxy-propane or oxy-MAPP gas mixtures for combustion. Temperatures may go up to 3100° C. internally for applying an aluminum coating. Conditions will, more likely than not, vary with the metal feedstock, type of gun and other variables. After a coating of desired thickness has been applied, the coated substrate surface may be inspected by any of a variety of techniques in process 260. Inspection techniques may test for coating thickness, porosity, bond strength, surface roughness, hardness, etc.

In the event that the composite substrate to be coated is a previously metal-coated substrate that requires coating repair, an initial process 305 of removing the existing coating partially (i.e., in the damaged area only) or completely may be carried out. This will expose underlying composite surfaces for the application of a coating of the micro balloon-containing resin. Thereafter, the process as outlined above may be followed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An article comprising a metallized composite aircraft panel, the panel including:

a composite aircraft panel substrate comprising a filler material encapsulated in a resin matrix, the composite panel substrate comprising on at least a portion of a surface thereof:

an adhesion-promoting layer comprising resin and glass microballoons adhered to the at least a portion of the surface of the composite panel substrate; and a metallic coating adhered to the adhesion-promoting layer to produce a metallized surface, the metallic coating including aluminum.

2. The article of claim 1, wherein the microballoons comprise a size distribution from about 1.0 to about 300 microns.

3. The article of claim 1, wherein the resin comprises epoxy resin.

4. The article of claim 3, wherein the adhesion-promoting layer has a thickness of about 5 mils to about 15 mils.

5. The article of claim 1, wherein at least some of the microballoons are broken.

6. The article of claim 1, wherein the metallic coating is a sprayed on coating.

* * * * *